No. 888,632. PATENTED MAY 26, 1908.
A. MILLER.
WHIFFLETREE CLIP.
APPLICATION FILED MAY 28, 1907.
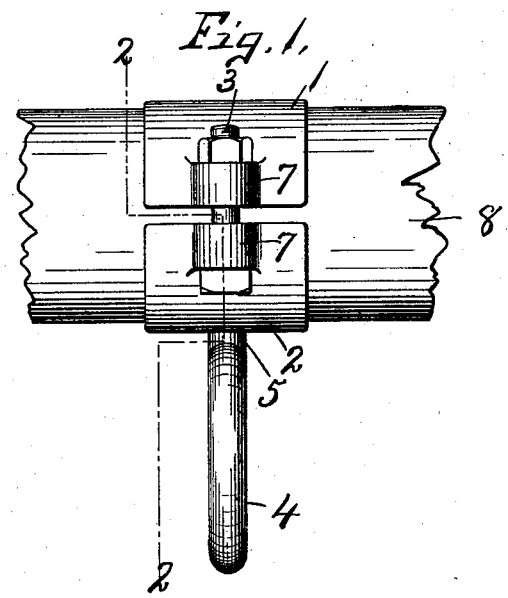
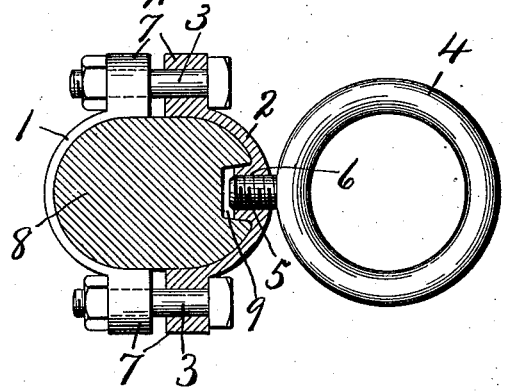 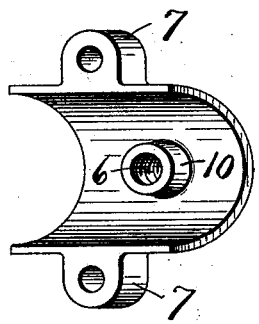
Witnesses.
Inventor.
A. Miller
By.
Howard P. Denison
Attorney.

UNITED STATES PATENT OFFICE.

ADOLPH MILLER, OF SYRACUSE, NEW YORK.

WHIFFLETREE-CLIP.

No. 888,632.     Specification of Letters Patent.     Patented May 26, 1908.

Application filed May 28, 1907. Serial No. 376,133.

*To all whom it may concern:*

Be it known that I, ADOLPH MILLER, of Syracuse, in the county of Onondaga, in the State of New York, have invented new and useful Improvements in Whiffletree-Clips, of which the following, taken in connection with the accompanying drawings, is a full, clear, and exact description.

This invention relates to certain improvements in clips for eveners, whiffletrees and the like, and comprises essentially two opposed but separate clip elements adapted to be clamped by bolts or similar fastening means to the whiffletree or like part of a vehicle, one of said clamping sections being provided with a loop or eye for the reception of a link or other attaching elements.

My object is to provide means whereby these clips may be readily attached and taken up or tightened as the wood upon which they are clamped shrinks.

Another object is to provide one of the clamps. with an inwardly projecting boss adapted to be seated in a socket in the adjacent side of the wood to hold the clip against undue turning movement, the stud being provided with a threaded aperture to receive the threaded stem of the loop or eye.

Other objects and uses will be brought out in the following description.

In the drawings—Figure 1 is a top plan of a clip embodying the features of my invention. Fig. 2 is a sectional view taken on line 2—2, Fig. 1, showing the eye in elevation. Fig. 3 is a perspective view from the interior of one of the clip sections showing particularly the boss or stud therein.

This clip preferably consists of two substantially semi-circular sections —1— and —2—, clamping bolts —3— for drawing said sections together, and an eye —4— having a threaded stem —5— which is screwed into a threaded socket —6— in one side of the section —2—.

Each section —1— and —2— is provided at its meeting face with a pair of diametrically opposite apertured ears —7— for receiving the clamping bolts —3—, the meeting face of said sections —1— and —2— being separated a slight distance when tightened upon the bar as a whiffletree or evener —8— to allow a sufficient take up to compensate for shrinkage of the wood of which the whiffletree or evener —8— is formed. One side of this wood bar —8— adjacent to the clip section is formed with a socket —9— for receiving an inwardly projecting boss —10— on the inner face of the clip section —2—, said boss having the threaded aperture —6— extended thereinto and serving as a means to prevent rotation or turning of the clip upon the bar —8—.

The threaded stem 5 of the eye —4— as previously stated is screwed into the threaded socket and, therefore, may be readily removed if broken and replaced by a new one, but I do not wish to limit myself to the screwing of this eye into the adjacent clip section —2— but rather to claim particularly the fastening of the shank of the eye —4— into said clip section, the inner end of said shank being preferably upset to prevent accidental displacement or removal of the eye.

The clip sections —1— and —2— are considerably wider than their ears —7— so as to afford a broad bearing on the bar —8— without adding unnecessary weight on the ears. These clips —1— and —2— are preferably formed of wrought iron but may be made of maleable iron or any other metal sufficiently strong to withstand the strain to which they are subjected.

What I claim is:

A device of the class described, comprising two semi-cylindrical sections having their ends extended in opposite directions to form apertured ears and with an apertured internally threaded boss extending inwardly from one of said sections, said sections adapted to bear upon opposite sides of a body with said boss entering a cavity in the body, a clamp bolt engaging each opposite pair of said ears, and a loop having a stem secured in the aperture of said boss.

In witness whereof I have hereunto set my hand this 9 day of May 1907.

ADOLPH MILLER.

Witnesses:
HOWARD P. DENISON,
M. M. NOTT.